United States Patent
Li et al.

(10) Patent No.: US 7,873,055 B2
(45) Date of Patent: Jan. 18, 2011

(54) SCHEDULING USER TRANSMISSIONS OF MOBILE STATIONS ON A REVERSE LINK OF A SPREAD SPECTRUM CELLULAR SYSTEM

(75) Inventors: Shupeng Li, Middlesex, NJ (US); Sudhir Ramakrishna, New York, NY (US); Ashok Narasimhaiya Rudrapatna, Somerset, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 488 days.

(21) Appl. No.: 11/256,626

(22) Filed: Oct. 21, 2005

(65) Prior Publication Data
US 2007/0091837 A1    Apr. 26, 2007

(51) Int. Cl.
    H04L 12/28    (2006.01)
(52) U.S. Cl. .............................. 370/395.4; 370/395.41; 370/395.43; 370/328; 370/329; 370/319
(58) Field of Classification Search ................ 455/443, 455/452.2, 452.1, 515; 370/328–338, 395.4, 370/395.41, 395.43, 319
    See application file for complete search history.

(56) References Cited

U.S. PATENT DOCUMENTS

| | | | | |
|---|---|---|---|---|
| 7,477,899 | B2 * | 1/2009 | Vasudevan ................. | 455/439 |
| 2004/0141481 | A1 * | 7/2004 | Lee et al. .................... | 370/335 |
| 2005/0036458 | A1 * | 2/2005 | Yoon et al. .................. | 370/328 |
| 2005/0111397 | A1 * | 5/2005 | Attar et al. .................. | 370/319 |
| 2005/0111412 | A1 * | 5/2005 | Hosein et al. ............... | 370/333 |
| 2005/0120097 | A1 * | 6/2005 | Walton et al. ............... | 709/220 |
| 2006/0274689 | A1 * | 12/2006 | Li et al. ....................... | 370/329 |

OTHER PUBLICATIONS

Jari Isokangas, et al. "Multicast in UMTS" Nokia, Feb. 12, 2002.

* cited by examiner

*Primary Examiner*—Ajit Patel
*Assistant Examiner*—Khai M Nguyen
(74) *Attorney, Agent, or Firm*—WIlliams, Morgan & Amerson

(57) ABSTRACT

The present invention provides a method and an apparatus for wireless communication between a base station and at least two mobile stations in a cellular system. The method comprises sending on a forward link at least one of a first and a second command to the at least two mobile stations that the base station is serving on a reverse link. The method further comprises controlling a transmission in at least one of a first and a second transmission mode of at least one mobile station among the at least two mobile stations on the reverse link based on the at least one of the first and second commands. Each of at least two mobile stations may determine a change of transmission mode between an orthogonal or a non-orthogonal transmission mode on a reverse link based on a message on a forward link. A scheduler at a serving base station may match scheduling or transmission resources to the transmissions on the reverse link. The mobile stations being served may use orthogonal and non-orthogonal transmission modes for the transmissions in a non-overlapping fashion in any combination of time, frequency and spatial domains. By selectively assigning a set of mobile stations to the orthogonal or non-orthogonal modes of transmission, the serving base station may enable fairness across the mobile stations.

9 Claims, 6 Drawing Sheets

SCHEDULING USER TRANSMISSIONS OF MOBILE STATIONS ON A REVERSE LINK OF A SPREAD SPECTRUM CELLULAR SYSTEM

1. FIELD OF THE INVENTION

This invention relates generally to telecommunications, and more particularly, to wireless communications.

2. DESCRIPTION OF THE RELATED ART

Wireless communications systems or mobile telecommunication systems typically provide different types of services to various users or subscribers of wireless communication devices. The wireless communication devices may be mobile or fixed units and situated within a geographic region across one or more wireless networks. The users or subscribers of wireless communication devices, such as mobile stations (MSs) or access terminals or user equipment may constantly move within (and outside) particular wireless networks.

A wireless communications system generally includes one or more base stations (BSs) that can establish wireless communications links with mobile stations. Base stations may also be referred to as node-Bs or access networks. To form the wireless communications link between a mobile station and a base station, the mobile station accesses a list of available channels/carriers broadcast by the base station. To this end, a wireless communications system, such as a spread spectrum wireless communications system, may allow multiple users to transmit simultaneously within the same wideband radio channel, enabling a frequency re-use based on a spread spectrum technique.

Many cellular systems, for example, spread-spectrum cellular systems use a Code division multiple access (CDMA) protocol to transmit data in a wireless network consistent with a desired standard, such as IS-95, CDMA2000 or Universal Mobile Telecommunication System (UMTS) based wideband-CDMA (WCDMA). A spread-spectrum cellular system generally provides transmissions associated with one or more mobile stations that a base station may be serving on the downlink (a.k.a. forward (FL) link). As such, transmissions from the mobile stations to the sector may occur on the uplink (a.k.a. reverse link (RL)).

For establishing a wireless communication in a cellular system, a base station (BS) schedules the transmissions of the various mobile stations (MSs) that it is serving on the MS-to-BS (reverse link, RL). To this end, the base station may send commands to the mobile stations on the BS-to-MS link (forward link, FL). For example, in a particular cellular system, the mobile stations may use time units based radio access commonly referred to as time slots to transmit on the reverse (RL) link to the base station. The time slots are usually quasi-synchronized (e.g., approximately at the slot boundaries) across the mobile stations (MSs) and the base station (BSs).

Likewise, on the reverse link (RL), one or more mobile stations may communicate with a serving base station, for example, in two transmission modes. That is, when communicating on the reverse link, if transmissions to the serving base station from a particular subset of mobile stations interfere with each other at the base station then the mobile stations may be in a first transmission mode called a non-orthogonal mode. For example, use of a CDMA or a multi-carrier CDMA (MC-CDMA) protocol for radio access by the subset of mobile stations to communicate on the reverse link may cause the subset of mobile stations to be in the first transmission mode. In this case, the transmissions to the serving base station from the subset of mobile stations occur on the same frequency bandwidth while utilizing non-orthogonal codes. As a result, the transmissions can not be orthogonal to each other, and thus interfere with each other at the base station. When a mobile station transmits in the non-orthogonal mode, this situation may apply to either pilot (used for demodulation or for SINR estimation) or for bearer/traffic channels or to both channels.

However, if the transmissions from a subset of mobile stations on the reverse link are such that they do not interfere with each other at the serving base station, the subset of mobile stations are characterized as being in a second transmission mode. In the second transmission mode, this subset of mobile stations is referred to as being in the orthogonal mode. For example, such an orthogonal mode may result for a subset of mobile stations when the subset of mobile stations communicates on the reverse link using Orthogonal Frequency Division Multiplexing (OFDM) as the radio access technique. In this case, the transmissions from the subset of mobile stations being served by a base station occur on different radio frequencies and are orthogonal to one another. Consequently, the transmissions in the second transmission mode do not interfere with each other at the base station. Again, as is the situation in the non-orthogonal mode, this scenario may apply to either pilot or for bearer/traffic channels or to both channels when a mobile station is transmitting in the orthogonal mode.

By sending one or more messages on the forward link, a base station (BS) may control the mobile station transmissions in two control modes. To indicate a first control mode referred to as a Common Rate Control (CRC) mode, a base station may send a common command, which is applicable to all the mobile stations (MSs) that the base station is controlling, on the forward link (FL). Each mobile station receives the command, interprets it, makes appropriate changes to its transmission mode on the reverse link, and transmits data packets to the base station on the reverse link (RL). As an example, the base station may transmit a single number between 0 and 1 on the forward link. Each mobile station, upon receiving this number, performs a test such that the probability of an "outcome" occurring equals the number transmitted on the forward link. If the test result indicates the "outcome," the mobile station increases it's transmit rate on the reverse link by a pre-determined amount, else it keeps it's transmit rate the same as before.

For indicating a second control mode, referred to as a Dedicated Rate Control (DRC) mode, a base station may send a separate command for each mobile station whose transmission characteristics it wants to change among the mobile stations the base station is controlling. Each mobile station receives and interprets the command meant for it, and makes appropriate changes to its reverse link transmission. A mobile station may be either adapted to not receive a command intended for another mobile station or adapted to not respond to commands issued to the other mobile station.

With respect to the two mobile station transmission modes, however, under similar conditions, the orthogonal mode supports higher mobile station transmission rates than the non-orthogonal mode. This is because of the lack of mutual interference among the mobile station transmissions in the former as compared to the latter. With respect to the two base station control modes, the CRC mode affords coarse control over the mobile transmissions while requiring minimal forward link resources to be expended. The DRC mode allows finer mobile station transmission control at the expense of larger forward link resources.

To obviate the above set forth imbalance across the two mobile station transmission modes and the two base station control modes, one approach uses either the DRC mode or the CRC mode for controlling the transmissions of all mobile stations. However, with its higher forward link signaling cost, use of the DRC mode over the CRC mode to schedule non-orthogonal transmissions may be inefficient. On the other hand, when scheduling orthogonal transmissions where higher rates may be supportable, the CRC mode may fail to provide the desired fine control that the DRC mode generally affords. Accordingly, this mismatch of the forward link resources to the transmission mode on the reverse link may result in an overall inferior performance of a cellular system.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method is provided for wireless communication between a base station and at least two mobile stations in a cellular system. The method comprises sending on a forward link at least one of a first and a second command to the at least two mobile stations that the base station is serving on a reverse link. The method further comprises controlling a transmission in at least one of a first and a second transmission mode of at least one mobile station among the at least two mobile stations on the reverse link based on the at least one of the first and second commands.

In another embodiment of the present invention, a method is provided for wireless communication between a base station and a mobile station in a cellular system. The method comprises receiving a message sent on a forward link to the mobile station; determining a change of transmission mode between an orthogonal or a non-orthogonal transmission mode on a reverse link of the mobile station based on the message; and communicating with the base station using the first or the second transmission mode on the reverse link based on the change of transmission mode.

BRIEF DESCRIPTION OF THE DRAWINGS

The invention may be understood by reference to the following description taken in conjunction with the accompanying drawings, in which like reference numerals identify like elements, and in which.

Figure 1:
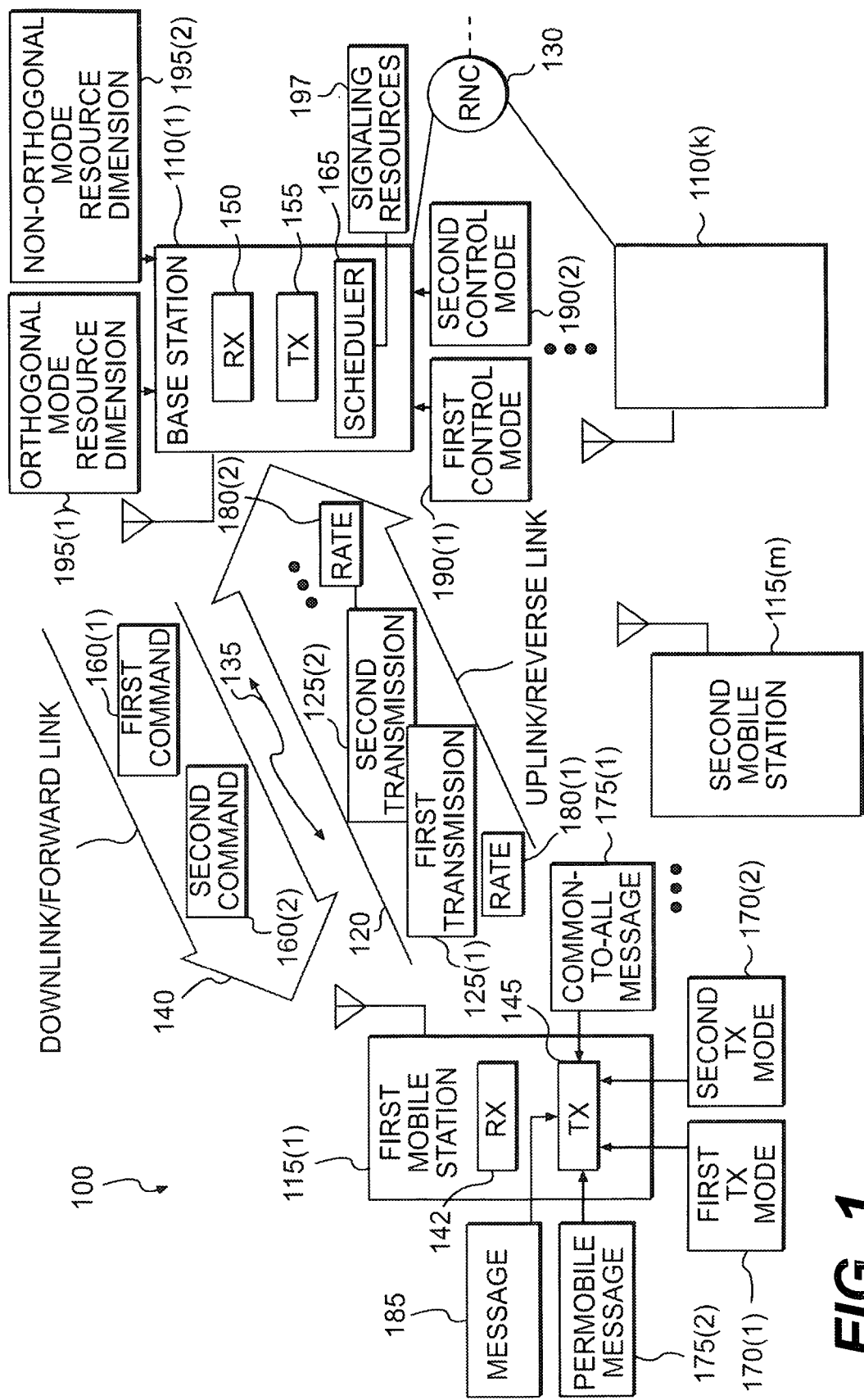
FIG. 1 schematically depicts a cellular system, which schedules user transmissions of multiple mobile stations on a reverse link in a non-overlapping manner based on signaling on a forward link according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for wireless communication between a base station and at least two mobile stations in a cellular system, such as a spread-spectrum wireless communications system. The method comprises sending on a forward link at least one of a first and a second command to the at least two mobile stations that the base station is serving on a reverse link. The method further comprises controlling a transmission in at least one of a first and a second transmission mode of at least one mobile station among the at least two mobile stations on the reverse link based on the at least one of the first and second commands. Each of at least two mobile stations may determine a change of transmission mode between an orthogonal or a non-orthogonal transmission mode on a reverse link based on a message on a forward link. A scheduler at a serving base station may match scheduling or transmission resources to the transmissions on the reverse link. Using a frame format, the scheduler may schedule transmissions on the reverse link in a first (e.g., non-orthogonal) and a second (e.g., orthogonal) transmission mode in a non-overlapping manner. The mobile stations being served may use orthogonal and non-orthogonal transmission modes for the transmissions in a non-overlapping fashion in any combination of time, frequency and spatial domains. By selectively assigning a set of mobile stations to the orthogonal or non-orthogonal modes of transmission, the serving base station may enable fairness across the mobile stations. Examples of the non-orthogonal and orthogonal modes of transmission include pilot and bearer data.

Referring to FIG. 1, a cellular system 100 is illustrated to include a plurality of mobile stations (MSs) 115 (1-m) and a set of base stations (BSs) 110 (1-k) that may control non-overlapping user transmissions on a reverse link 120 based on signaling on a forward link 140 for using different transmission modes according to one illustrative embodiment of the present invention. The set of base stations 110 (1-k) may provide the wireless connectivity to at least two mobile stations, such as a first and second mobile station 115 (1,m) according to any desirable protocol. Examples of a protocol include a code division multiple access (CDMA, CDMA2000) protocol, wideband-CDMA (WCDMA) protocol, a Universal Mobile Telecommunication System (UMTS) protocol, a Global System for Mobile communications (GSM) protocol, and like.

Examples of the mobile stations 115 (1,m) may include a host of wireless communication devices including, but not limited to, cellular telephones, personal digital assistants (PDAs), and global positioning systems (GPS) that employ the spread spectrum cellular system 100 to operate in a high-speed wireless data network, such as a digital cellular CDMA network. Other examples of the mobile stations 115 (1,m) may include smart phones, text messaging devices, and the like.

In the cellular system 100, mobile communications that communicate messages between the set of base stations 110 (1-k) and each mobile stations 115 (1,m) may occur over an air interface via a wireless channel 135, such as a radio frequency (RF) medium channel that uses a code division multiple access (CDMA) protocol. Although not shown, the wireless channel 135 may include any intermediate devices that facilitate wireless communication between the mobile stations 115 (1,m) and the set of base stations 110 (1-k). For example, the wireless channel 135 may use a variety of repeaters, antennas, routers, and any desirable communication or network component capable of providing wireless communication. Each mobile station 115 (1,m) may further communicate with the set of base stations 110 (1-k) using the uplink (reverse link) 120 over the wireless channel 135.

A radio network controller 130 may coordinate a handover of mobile communications upon a user leaving an area of responsibility of a first base station 110(1), into a second base station 110(k). That is, a handover of mobile communications occurs for the first mobile station 115(1) when responsibility of communication switches from a first cell sector served by a first base station 110(1) to a second cell sector served by a second base station 110(k).

According to one illustrative embodiment of the present invention, the cellular system 100 may include a frame selector unit (FSU) connected to both the base stations, comparing the frames received by the first and second base stations 110(1) and 110(k) to identify the better frame. This makes it possible for two (or more) base stations of the set of base stations 110(1-k) to seamlessly support the mobile stations 115(1-m).

To communicate with different base stations 110(1-k), the mobile station 115(1) may comprise a receiver (RX) 142 and a transmitter (TX) 145. While the receiver 142 may receive transmissions of packet data from the set of base stations 110(1-k), the transmitter 145 may transmit packet data selectively in multiple transmission modes. Each transmission mode for transmitting the packet data to the set of base stations 110(1-k) may be associated with a different cell sector of a base station.

For the purposes of providing signaling about selecting transmission modes for transmitting the packet data, the base station (110(1) of the set of base stations 110(1-k) may signal to the mobile station 115(1) an indication based one reception of packet data from all the mobile stations 115(1-m) that the base station 110(1) may be serving or controlling. To this end, each base station 110 may comprise a receiver (RX) 150 and a transmitter (TX) 155 in one embodiment of the present invention. While the receiver 150 may receive transmissions of packet data from the mobile stations 115(1-m), the transmitter 155 may transmit packet data and signaling messages for selectively controlling multiple transmission modes thereof.

The base station 110(1) may further comprise a scheduler 165 to schedule user transmissions of the packet data in a desired transmission mode on the reverse link 120 based on the signaling messages provided on the forward link 140 to a set of mobile stations 115(1m) that the base station 110(1) may be serving. By using the scheduler 165, the base station 110(1) may schedule user transmissions of packet data from the set of mobile stations 115(1m).

In particular, the base station 110(1) may be serving a first and a second mobile station 115(1,m) on the reverse link 120. To control the transmission mode of a first transmission 125 (1) and/or a second transmission 125(2) of a mobile station among at least two mobile stations 115(1,m) on the reverse link 120, the base station 110(1) may send a first command 160(1) and/or a second command 160(2). Based on the first and/or second commands 160(1,2), at least one mobile station 115(1) may opt to transmit in a first and/or a second transmission mode 170(1,2).

Alternatively, another mobile station 115(m) may provide the first or second transmissions 125(1,2) on the reverse link 120, such that both the transmissions may use one of the first or second transmission modes 170(1,2). Regardless, the first transmission 125(1) may be in the first transmission mode 170(1) and the second transmission 125(2) may be in the second transmission mode 170(2) such that the first and second transmission modes 170(1,2) occur in a non-overlapping relationship in time, frequency, spatial domains or in a combination thereof.

To indicate use of the first and/or second transmission modes 170(1,2) to the first and second mobile stations (1,m) that the base station 110(1) may be serving, the transmitter 115 may send messages via the first and/or second commands 160(1,2) to the first and second mobile stations 115(1,m). Consistent with one embodiment, the first mobile station 115(1) may transmit the first transmission 125(1) to the base station 110(1) or another base station 110(k) over the reverse link 120. The forward link 140 may provide a per-mobile messages (175(2)) and/or a common-to-all message 175(1) to the first mobile station 115(1).

The first and/or second mobile stations 115(1,m) may indicate to the base station 110(1) a first data rate 180(1) and a second data rate 180(2), respectively. In particular, the first command 160(1) on the forward link 140 may indicate the common-to-all mobile message 175(1) to each of the two mobile stations 115(1,m). The common-to-all mobile message 175(1) may control the rate 180(1) of data packet transmission, such as that of the first transmission 125(1) on the reverse link 120 associated with the two mobile stations 115 (1,m) when the base station 110(1) may be serving the two mobile stations 115(1,m) on the forward link 140. The common-to-all message 175(1) may cause each transmission to be non-orthogonal to one another.

Accordingly, the first transmission 125(1) in the first transmission mode 170(1) on the reverse link 120 from at least two mobile stations, i.e., 115(1,m) may be in non-orthogonal mode. In other words, a particular subset of mobile stations 115(1-m) may be in non-orthogonal mode if the associated transmissions to a base station interfere with each other at that base station. For example, the subset of mobile stations may use a code division multiple access (CDMA) protocol, or a multi-carrier CDMA (MC-CDMA) radio access technique to communicate on the reverse link 120. In this case, the non-orthogonal transmissions may utilize non-orthogonal codes and occur on the same frequency bandwidth.

The second command 160(2) may indicate the per-mobile message 175(2) to each of the at least two mobile stations 115(1,m). The per-mobile message 175(2) may separately control a rate 180(2) of data packet transmission, such as that of the second transmission 125(2) on the reverse link 120 from at least one of the two mobile stations, e.g., the first and second mobile stations 115(1,m) when the base station 110(1) serves the two mobile stations 115(1,m) on the forward link 140. In this case, each transmission from the two mobile stations, i.e., the second transmission 125(2) using the second transmission mode 170(2) to form an orthogonal relationship to one another.

As such, the two second transmissions 125(2) from the two mobile stations 115(1) on the reverse link 120 may not interfere with each other at the base station 110(1). This indicates that a subset of mobile stations, such as the first and second mobile stations 115(1,m) may be transmitting in an orthogonal mode. By using orthogonal frequency division multiplexing (OFDM) as the radio access technique, for example, the subset of the mobile stations 115(1-m) may communicate on the reverse link 120. Since the second transmission 125(2) from each of the two mobile stations 115(1,m) occurs on different radio frequencies, each transmission in the second transmission mode 170(2) on the reverse link 120 are orthogonal to one another.

In one embodiment, the base station 110(1), which may be serving at least two mobile stations, such as the first and second mobile stations 115(1,m), may control use of a transmission mode on the reverse link 120 based on a first and a second control mode 190(1,2). More specifically, for indicating the first control mode 190(1), the base station 110(1) that may be controlling the two mobile stations 115(1,m) and all of the other mobile stations 115(2, k-1), may send a common command, such as the first command 160(1). The common command, i.e., the first command 160(1) may be applicable to the first and second mobile stations 115(1,m) and all the other mobile stations being controlled by the base station 110(1) on the forward link 140. To indicate the second control mode 190(1), the base station 110(1) may send a separate or a dedicated command, such as the second command 160(2) to each of the first and second mobile stations 115(1,m) and all of the other mobile stations 115(m-1) being served by the base station 110(1).

The base station 110(1) may send a message(s) 185 that indicates the first and/or second control modes 190(1,2) to at least one of the two mobile stations 115(1,m). The first mobile station 115(1) may receive the message(s) 185 on the forward link 140. Using the message(s) 185, the first mobile station 115(1) may determine a change of transmission mode between an orthogonal or a non-orthogonal mode on the reverse link 120. Based on the change of transmission mode, the first mobile station 115(1) may communicate with the base station 110(1) using either the first or the second transmission mode 170(1), 170(2) on the reverse link 120.

The message(s) 185 may be sent on the forward link 140 to each of at least two mobile stations, such as the first and second mobile stations 115(1,m) and all other mobile stations 115(2,m-1) that the base station 110(1) may be controlling in the forward link 140. In this way, the base station 110(1) may control transmissions in at least two transmission modes as indicated by the message(s) 185 sent on the forward link 140. For example, the first and second transmission modes 170(1, 2) may be used for the transmission in a non-overlapping fashion in any combination of time, frequency and spatial domains.

Each mobile station 115 may transmit traffic packets, such as data packets in the first and second transmissions 125(1, 2). For example, traffic packets may include voice information, images, video, data requested from an Internet site, and the like. In contrast, the signaling messages 175(1,2) or the message 185 are used to provide the first and the second command 160(1,2) intended to be used by each mobile station 115 and/or other elements of the spread-spectrum cellular system 100. The signaling messages 175(1-2) may further include configuration messages, setup instructions, switch instructions, handoff instructions, and the like.

The base station 110(1) may use the scheduler 165 to schedule the first transmission 125(1) of the first and second mobile stations 115(1,m) in a non-orthogonal mode based on at least one of a common rate control (CRC) command or a dedicated rate control (DRC) command. Likewise, the scheduler 165 may schedule the second transmission 125(2) of the first and second mobile stations 115(1,m) in an orthogonal mode based on the dedicated rate control (DRC) command. The first command 160(1) may indicate the first control mode 190(1). Likewise, the second command 160(2) may include the dedicated rate control command for the second control mode 190(2).

The scheduler 165 may allocate one or more transmission or signaling resources 197 to the first and second transmission modes 170(1,2) in a non-overlapping fashion. Examples of the signaling or transmission resources 197 include a number of time slots or a number of frequency sub-bands or a number of spatial dimensions allocated to a particular transmission mode. To this end, the scheduler 165 may selectively assign time slots to at least two mobile stations, such as the first and second mobile stations 115(1,m) to the orthogonal or non-orthogonal modes. By selectively assigning the time slots or frequency sub-bands, the scheduler 165 may match scheduling or transmission resources 197 to the transmissions on the reverse link 120. In particular, the scheduler 165 may match the signaling resources 197 used on the forward link 140 to a transmission mode on the reverse link 120.

In one embodiment, the base station 110(1) may transmit one or more common rate control (CRC) commands to control a transmission in the first transmission mode 170(2) within a resource dimension 195(2) allocated on the reverse link 120 for the non-orthogonal mode. A relationship may be pre-established between a particular common rate control command among the one or more common rate control commands and the resource dimension 195(2) for which the particular common rate control command is applicable. The base station 110(1) may transmit one or more dedicated rate control (DRC) commands to control a transmission in the second transmission mode 170(2) within a resource dimension 195(1) allocated on the reverse link 120 for the orthogonal mode. A relationship may be pre-established between a particular dedicated rate control command among one or more dedicated rate control commands and the resource dimension 195(1) for which the particular dedicated rate control command is applicable.

Consistent with one embodiment, the scheduler 165 may change the number of mobile stations 115 using the orthogonal or non-orthogonal modes over time. However, a particular mobile station may be operated in both modes. Accordingly, by selectively assigning a set of mobile stations to the orthogonal or non-orthogonal modes of transmission, the base station 110(1) may enable fairness across the mobile stations 115(1-m). For example, fairness may be obtained in terms of a transmission rate, which may be maintained across the mobile stations 115(1-m).

In the cellular system 100, a wireless data network may deploy any desirable protocol to enable wireless communications between the first and second base stations 110(1-k) and the mobile stations 115(1-m) according to any desirable protocol. Examples of such a protocol include a (CDMA, WCDMA) protocol, a UMTS protocol, a GSM protocol, and like. The radio network controller (RNC) 130 may be coupled to the first and the second base stations 110(1) and 110(k) to enable a user of the first and second mobile stations 115(1,m) to communicate packet data over a network, such as a cellular network. One example of the cellular network includes a digital cellular network based on a CDMA protocol, such as specified by the 3rd Generation (3G) Partnership Project (3GPP) specifications.

Other examples of such a protocol include a WCMDA protocol, a UMTS protocol, a GSM protocol, and like. The radio network controller 130 may manage exchange of wireless communications between the mobile stations 115(1-m) and the first and second base stations 110(1-k) according to one illustrative embodiment of the present invention. Although two base stations 110(1-k) and one radio network controller 130 are shown in FIG. 1, persons of ordinary skill in the pertinent art having benefit of the present disclosure should appreciate that any desirable number of base stations 110 and radio network controllers 130 may be used.

Each of the first and second base stations 110(1-k), sometimes referred to as Node-Bs, may provide connectivity to associated geographical areas within a wireless data network. Persons of ordinary skill in the art should appreciate that portions of such a wireless data network may be suitably implemented in any number of ways to include other components using hardware, software, or a combination thereof. Wireless data networks are known to persons of ordinary skill in the art and so, in the interest of clarity, only those aspects of a wireless data network that are relevant to the present invention will be described herein.

According to one embodiment, each mobile station 115 may communicate with an active base station 110 on the reverse link 120 via the radio network controller 130 coupled to the first and second base stations 110(1-k). Each mobile station 115 may communicate over the reverse link 120 with the active base station, which is generally referred to as the serving base station or the serving sector. The 3rd Generation Partnership Project (3GPP) standard defines the role of a serving base station or a serving sector and a serving radio network controller based on 3GPP specifications.

In one embodiment, the reverse link 120 and the forward link 140 may be established on a plurality of channels. The channels, such as traffic and control channels may be associated with separate channel frequencies. For example, CDMA channels with associated channel number and frequency may form a wireless communication link for transmission of high-rate packet data. On the forward link 140, for example, the first and second mobile stations 115(1,m) may update the first base station 110(1) with a data rate to receive transmissions on a Forward Traffic Channel or a Forward Control Channel. The Traffic Channel carries user data packets. The Control Channel carries control messages, and it may also carry user traffic. The forward link 140 may use a Forward MAC Channel that includes four sub-channels including a Reverse Power Control (RPC) Channel, a Data Rate Control Lock (DRCLock) Channel, ACK channel and a Reverse Activity (RA) Channel.

On the reverse link 120, the mobile stations 115(1,m) may transmit on an Access Channel or a Traffic Channel. The Access Channel includes a Pilot Channel and a Data Channel. The Traffic Channel includes Pilot, MAC and Data Channels. The MAC Channel comprises four sub-channels including a Reverse Rate Indicator (RRI) sub-channel that is used to indicate whether the Data Channel is being transmitted on the Reverse Traffic Channel and the data rate. Another sub-channel is a Data Rate Control (DRC) that is used by the first and second mobile stations 115(1,m) to indicate to the first base station 110(1) the first data rate 180(1) and the second data rate 180(2), respectively, that the Forward Traffic Channel may support on the best serving sector. An acknowledgement (ACK) sub-channel is used by the first and second mobile stations 115(1,m) to inform the first base station 110(1) whether the data packet transmitted on the Forward Traffic Channel has been received successfully. A Data Source Control (DSC) sub-channel is used to indicate which of the base station sectors should be transmitting forward link data.

In another embodiment, the mobile station 115(1) may request transmission of packet data, as shown in FIG. 1, from at least two cell sectors associated with one or more of the set of base stations 110(1-k). In one embodiment, the cellular system 100 may be based on a cellular network, which at least in part, may be based on a Universal Mobile Telecommunications System (UMTS) standard. The cellular network may be related to any one of the 2G, 3G, or 4G standards that employ any one of the protocols including the UMTS, CDMA2000, or the like, however, use of a particular standard or a specific protocol is a matter of design choice and not necessarily material to the present invention.

In one embodiment, a conventional Open Systems Interconnection (OSI) model may enable transmission of the packet data and other data including messages, packets, datagram, frames, and the like between the mobile station 115(1) and the set of base stations 110(1-k). The term "packet data" may include information or media content that has been arranged in a desired manner. The packet data may be transmitted as frames including, but not limited to, a radio link protocol (RLP) frame, signaling link protocol (SLP) frame or any other desired format. Examples of the packet data may include a payload data packet representative of voice, video, signaling, media content, or any other type of information based on a specific application.

Figure 2:
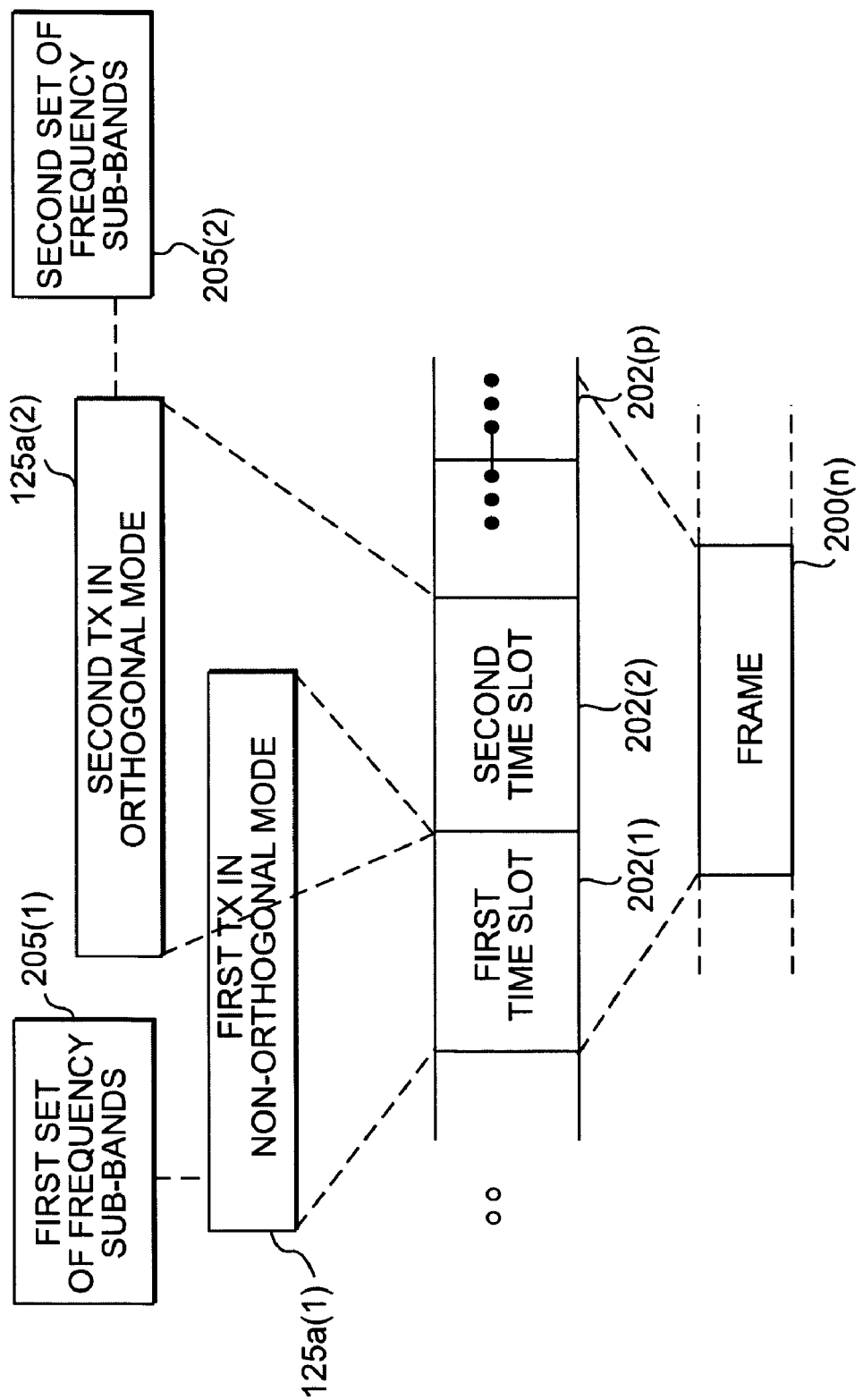
FIG. 2 schematically depicts a frame format that enables a wireless communication between a base station and at least two mobile stations in the cellular system shown in FIG. 1 in accordance with one illustrative embodiment of the present invention.

Referring to FIG. 2, a frame format 200 that enables a wireless communication between the base station 110(1) and at least two mobile stations 115(1,m) is illustrated for the cellular system 100 shown in FIG. 1, according to one embodiment of the present invention. The frame format 200 may comprise a plurality of frames a frame 200(n), which may further comprise a plurality of time-slots 202(1-p). In one embodiment, the frame 200(n) may comprise a 16 time slots. The frame format 200 may enable use of only the first transmission mode 170(1) in a first time slot(s) 202(1) associated with non-orthogonal mode. Likewise, the frame format 200 may enable use of only the second transmission mode 170(2) in a second time slot(s) 202(2) associated with the orthogonal mode.

The scheduler 165 may divide the number of time slots in a non-overlapping manner between a first transmission 125a(1) in non-overlapping manner and a second transmission 125a(2) in the orthogonal mode. In one embodiment, only non-orthogonal mode transmissions may occur in the time slots allocated to the non-orthogonal mode. Likewise, only orthogonal mode transmission may occur in the time slots allocated to the orthogonal mode.

Consistent with one embodiment, the scheduler 165 may allocate a first set of frequency sub-bands 205(1) of the overall frequency bandwidth to the first transmission 125a(1) being in the non-orthogonal mode. To the second transmission 125a(2) being in the orthogonal mode, the scheduler 165 may allocate a second set of frequency some sub-bands 205(2) of the overall frequency bandwidth. In this manner, the scheduler 165 may divide the overall frequency bandwidth in a non-overlapping manner between the first and second transmission modes 125a(1) 125a(2). Alternatively, the first and second transmission modes 125a(1), 125a(2) may be operated in a non-overlapping manner in the spatial domain. By using the frame format 200, the scheduler 165 may adjust allocation of one or more signaling or transmission resources 197 across the first transmission 125a(1) in the non-orthogonal mode and the second transmission 125a(2) in the orthogonal mode.

The frame format 200 may enable transmitting of the first transmission 125a(1) and the second transmission 125a(2) that may include traffic packets and signaling messages based on the CDMA2000 1xEV-DO specification, which uses a frequency band with channel bandwidth (1.23 MHz) and chip rate (1.2288 Mcps). In CDMA2000 1xEV-DO, for example, each forward link frame is 26.666 msec and consists of 16 slots. Like the forward link, the reverse link frame is 26.666 msec and consists of 16 slots.

Figure 3:
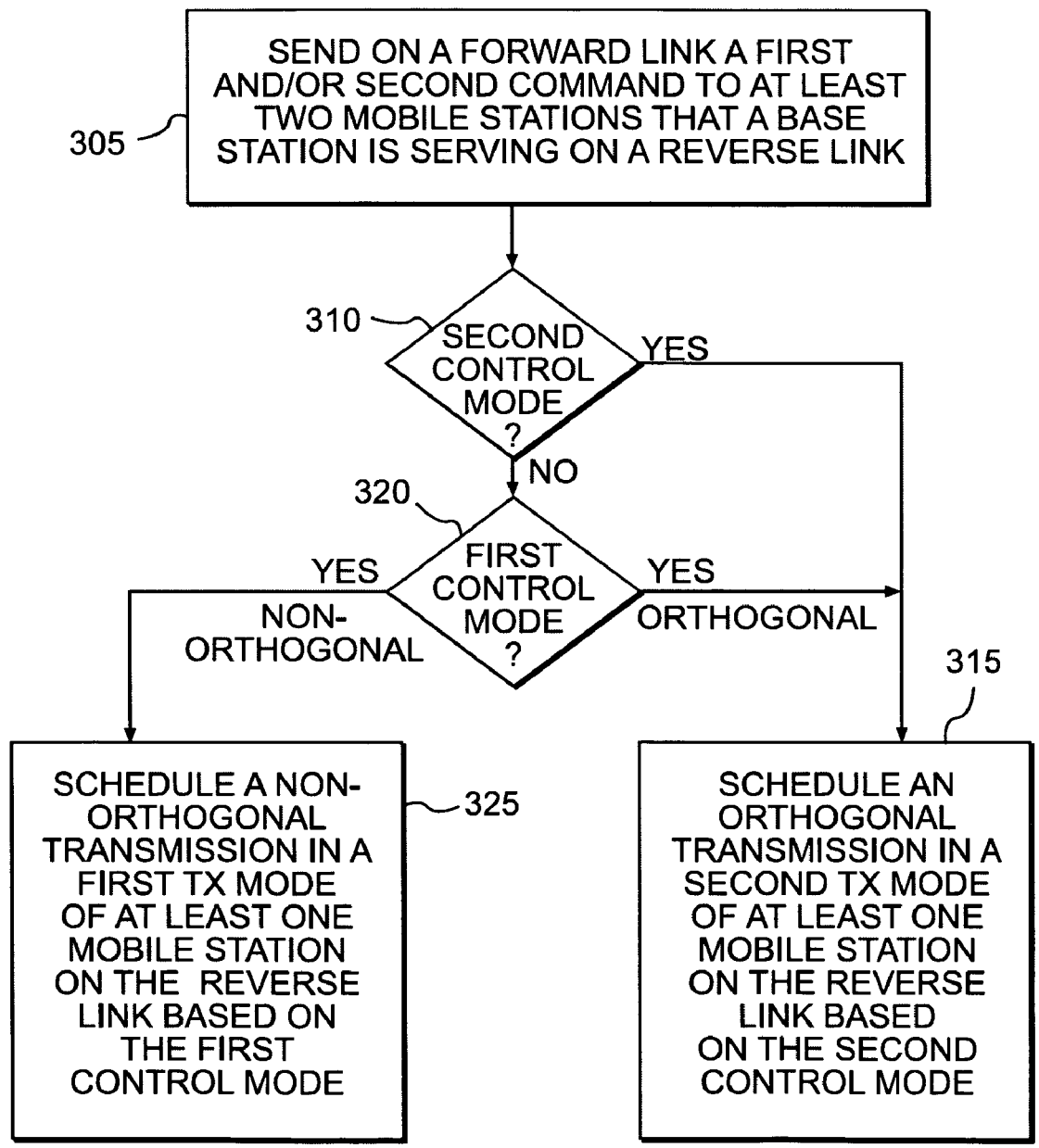
FIG. 3 depicts a stylized representation for implementing a method of controlling a transmission in at least two transmission modes, such as orthogonal and non-orthogonal modes, between the base station and at least two mobile stations based on the frame format shown in FIG. 2, consistent with one exemplary embodiment of the present invention.

Referring to FIG. 3, a stylized representation for implementing a method of controlling a transmission (between the base station 110(1) and at least two mobile stations 115(1, m)), in at least two transmission modes, such as orthogonal and non-orthogonal modes is illustrated with the frame format 200 depicted in FIG. 2, according to one embodiment of the present invention. Consistent with one exemplary embodiment of the present invention, in the cellular system 100 shown in FIG. 1, the base station 110(1) may use the scheduler 165 to allocate one set of time slots to the orthogonal mode transmissions and another set of time slots to the non-orthogonal mode transmissions.

At block 305, the base station 110(1) may send on the forward link 140 the first and/or second commands 160(1,2) to at least two mobile stations 115(1,m) that the base station 110(1) may be serving on the reverse link 120. A check at a decision block 310 at the mobile station 115(1) may determine whether the second control mode 190(2) is indicated by the base station 110(1). If so, at block 315, the mobile station 115(1) may transmit in an orthogonal mode transmission, i.e., in the second transmission mode 170(2) from at least one mobile station 115(1) on the reverse link 120.

If at the decision block 310, the second control mode 190(1)(2) is not indicated by the base station 110(1), at another decision block 320, the mobile station 115(1) may determine whether the first control mode 190(1) is indicated. When the first control mode 190(1) is indicated at the decision block 320, the mobile station 115(1) may operate either in a non-orthogonal mode or an orthogonal mode. For example, at block 325, the mobile station 115(1) may perform a non-orthogonal mode transmission, i.e., in the first transmission mode 170(1) from at least one mobile station 115(1) on the reverse link 120.

In this manner, at any given time all the transmitting mobile stations 115(1-m) may either use the orthogonal mode or non-orthogonal mode. For example, the first and second transmission modes 170(1,2) may be non-overlapping in the time domain, the frequency domain the spatial domain, or a combination thereof. When the two transmission modes 170(1,2) are indicated to be non-overlapping in the time domain, the time slots 202(1-p) may be designated by the scheduler 165 in such a manner that one set of the time slots is assigned to the orthogonal mode transmissions and the other set of time slots are assigned to non-orthogonal mode transmissions.

To provide non-overlapping transmissions in the first and second transmission modes 170(1,2) in the frequency domain, the total available frequency bandwidth, may be segregated in sub-bands, wherein in any frequency sub-band, all the transmitting mobile stations 115 may be either in the orthogonal mode or in the non-orthogonal mode. In the spatial domain, the scheduler 165 may segregate the transmissions in the two modes in a particular direction using transmit/receive antennas or beams, which may be formed using combinations of antennas. The scheduler 165 may allocate a combination of a time slot, frequency, sub-band and a particular beam orientation to provide the first and second transmission modes 170(1) for the mobile stations 115(1-m) in a non-overlapping manner using a combination of any one of time, frequency, and spatial domain. In other words, a combination of the time slot, the frequency sub-band and the beam orientation may segregate the orthogonal and non-orthogonal mode transmissions from the mobile stations 115(1-m) transmitting to the base station 110(1).

Accordingly, the scheduler 165 may provide non-overlapping segregation between the two transmission modes, 170(1,2) based on an available transmission resource dimension 195. To segregate signaling or transmission resources 197 on the reverse link 120, two or more available resource dimensions 195 may be simultaneously used in one embodiment. For example, the scheduler 165 may segregate the signaling or transmission resources 197 of the reverse link 120 based on the time and frequency resource dimensions simultaneously. In this case, a first number of time slots or a particular set of time slots and frequency sub-bands may be reserved for the first transmission mode 170(1) and a second number of time slots or a particular set of time slots and frequency sub-bands may be reserved for the second transmission mode 170(2). This non-overlapping segregation of the signaling or transmission resources 197 may apply to all the mobile stations 115 that are being served by a particular base station, such as the base station 110(1).

Both the base station 110(1) and the mobile stations 115(1-m) may use a segregation pattern that may vary over time. The scheduler 165 may synchronize the base station 110(1) and the mobile stations 115(1-m) based on a relationship between a transmission mode and the resource dimensions 195 that the segregation pattern indicates for a particular segregation of the signaling or transmission resources 197 associated with the reverse link 120. Using the scheduler 165, the base station 110(1) may determine the particular segregation, and convey such segregation to the mobile stations 115 being controlled by the base station 110(1). In one mode, referred to as a normal mode, the segregation pattern of the signaling or transmission resources 197 may be identical in all the base stations 110(1-k) with respect to the mobile stations 115 that a particular base station may be controlling. However, in a non-standard mode, the segregation pattern of the signaling or transmission resources 197 may not be identical and be different for different base stations.

In operation, the base station 110(1) may select a set of mobile stations 115 being controlled thereby to transmit using the resource dimension 195(1) that the base station 110(1) indicated for an orthogonal mode transmission. To this end, the base station 110(1) may send the dedicated rate control (DRC) command on the forward link 140. The DRC command may convey one ore more parameters for use by a desired set of mobile stations 115 that intend to transmit. In response to the dedicated rate control command indicated in an explicit message, such as the per-mobile message 175(2), one or more particular mobile stations 115 may use the designated orthogonal resource dimensions to transmit. Accordingly, the scheduler 165 may enable the base station 110(1) to select a set of mobile stations 115 to transmit and one or more signaling or transmission resources 197 that the set of mobile stations 115 may use for transmitting on the reverse link 120.

The base station 110(1) may transmit a common rate control command to a set of mobile stations 115 for controlling transmission on the reverse link 120 in the resource dimension 195(2) allocated for the non-orthogonal transmissions. The scheduler 165 may provide a pre-established relationship between a particular comment rate control command and the resources dimension 195 associated with the reverse link 120 to which that command is applicable. In one embodiment, all the mobile stations 115 being controlled by the base station 110(1) may receive and interpret the common rate control command. Based on the common rate control command, each mobile station 115 may determine whether to transmit, and if so, one or more signaling or transmission resources 197 to use in the non-orthogonal transmission mode. However, a particular mobile station 115 may transmit in both the orthogonal and non-orthogonal resource dimensions 195(1,2).

In one embodiment, use of additional signaling or transmission resources 197 in the dedicated rate control command to schedule the orthogonal mode transmissions on the forward link 140 may be compensated by the higher returns enabled by the second transmission mode 170(2), i.e., the orthogonal mode transmissions. Since, the common rate control command is used to control the first transmission mode 170(1) transmissions, i.e., the non-orthogonal transmissions, a significantly less signaling or transmission resources 197 associated with the forward link 120 may be used, even though the non-orthogonal transmissions provides lower returns on the reverse link 120 at the base station 110(1) from the set of mobile stations 115.

Figure 4:
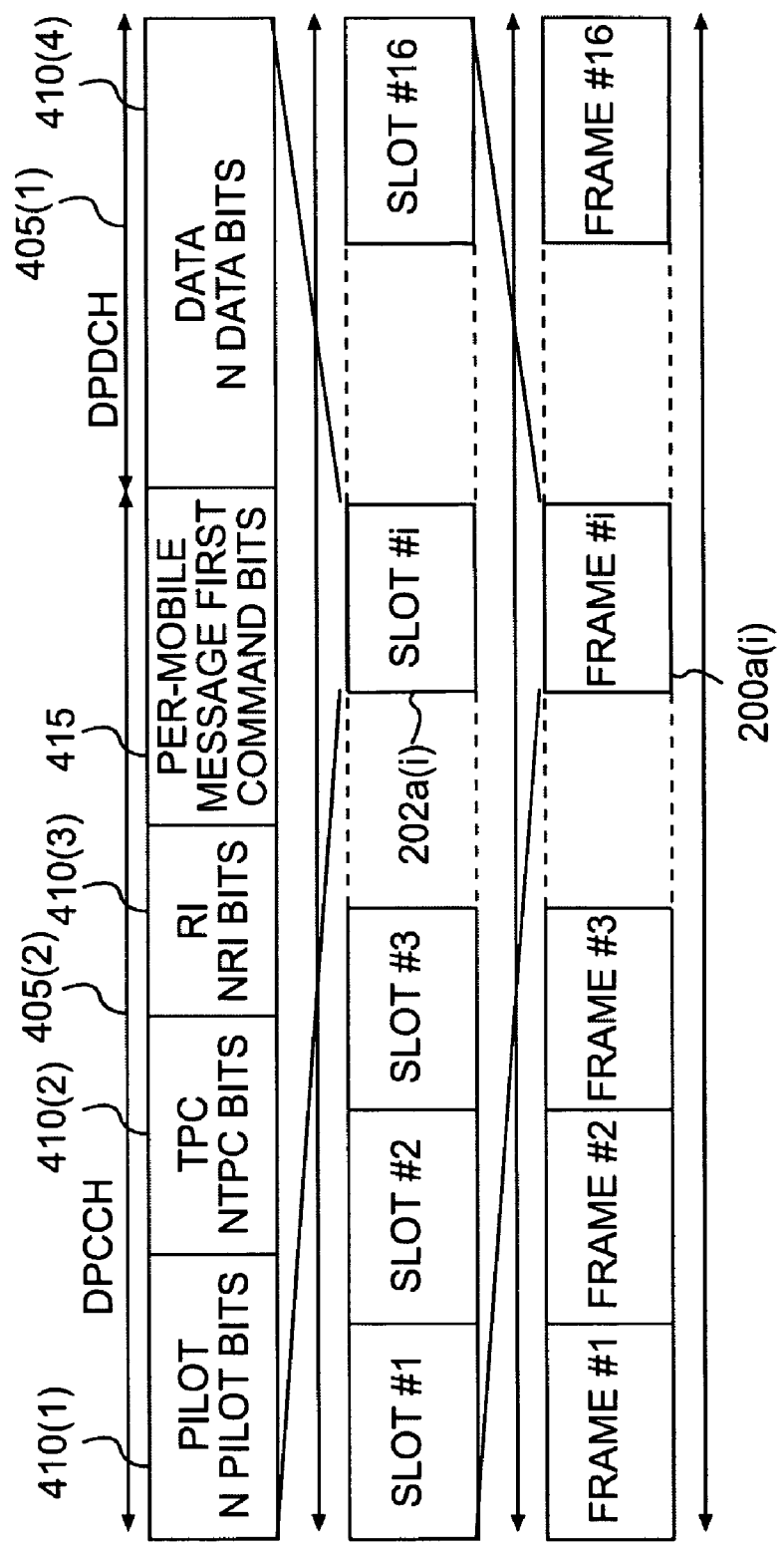
FIG. 4 illustrates a stylized representation of a frame format for signaling a per-mobile message on the forward link for controlling the transmission modes on the reverse link using a second command in accordance with one illustrative embodiment of the present invention.

Referring to FIG. 4, a frame format 400 depicts channel structures dedicated physical channels including, a dedicated physical data channel (DPDCH) and a dedicated physical control channel (DPCCH) 405(1,2) for the downlink or forward link 140. In the forward link 140, the DPCCH 405(2) and the DPDCH 405(1) may be time-multiplexed within the slots, such as a time slot 202a(i). The time slot 202a(i) may comprise one or more pilot bits 410(1), transmit power control bits (TCP) 410(2), rate information bits (RI) 410(3), and data bits 410(4). The data bits 410(4) may comprise data packets that the base station 110(1) may transfer or transmit over the forward link 140. The time slot 202a(i) may further include per-mobile message bits 415 associated with the first command 160(1). The length of the frame 200a(i) on the physical channels may be 10 mili-second, as one example. Each frame may comprise 16 time slots of each 0.625 mili-second.

Figure 5:
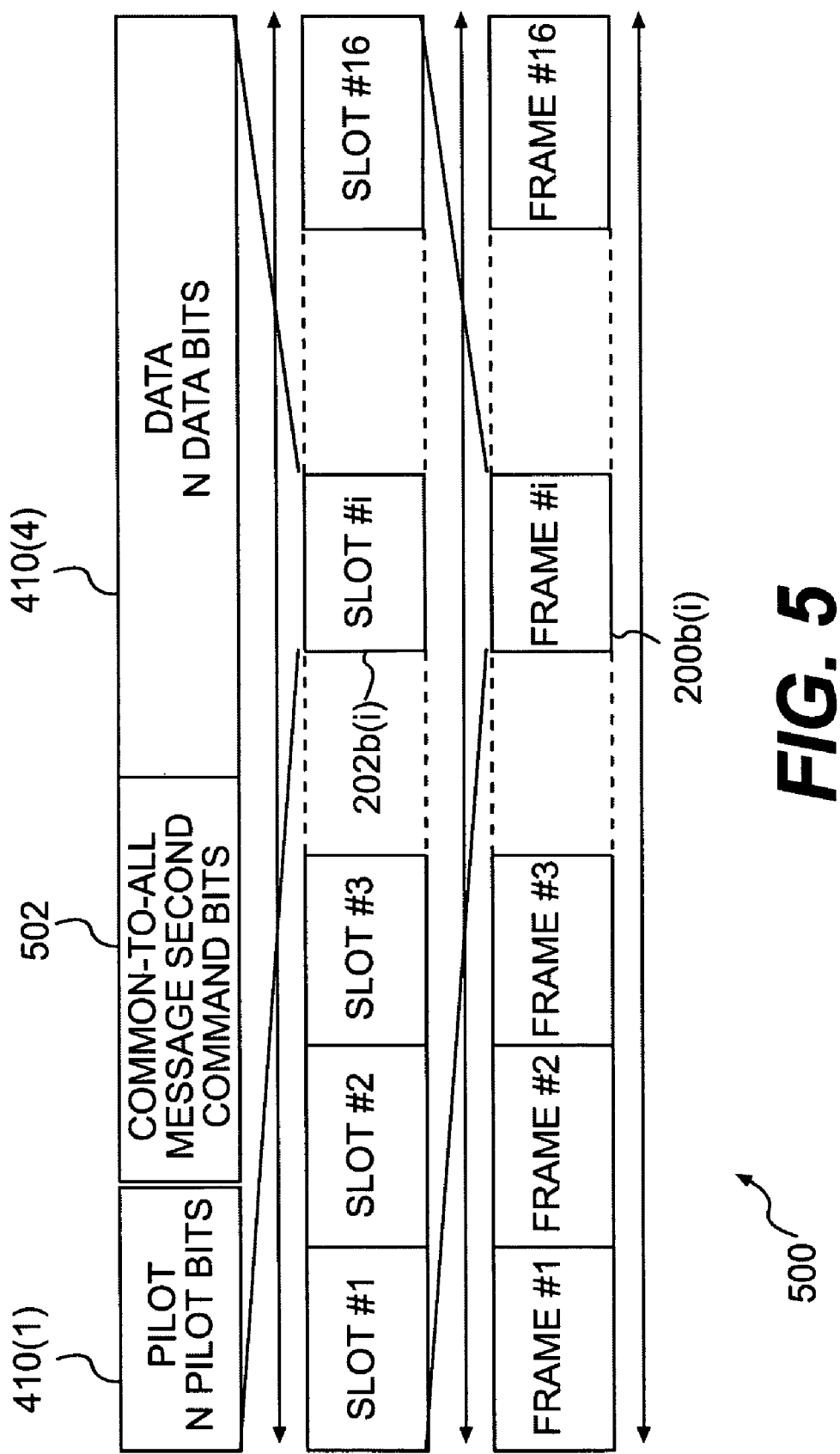
FIG. 5 illustrates a stylized representation of a frame format for signaling a common-to-all message on the forward link for controlling the transmission modes on the reverse link using a first command in accordance with one illustrative embodiment of the present invention.

Referring to FIG. 5, a frame format 500 illustrates a channel structure for signaling the common-to-all message 175(1) on the forward link 140, in accordance with one embodiment of the present invention. The frame format 500 includes a frame 200b(i) that further includes a time slot 202b(i). The time slot 202b(i) may include the pilot bits 410(1) and the data bits 410(4). The time slot 202b(i) may further include common-to-all message bits 502 associated with the second command 160(2), as shown in FIG. 1.

Figure 6:
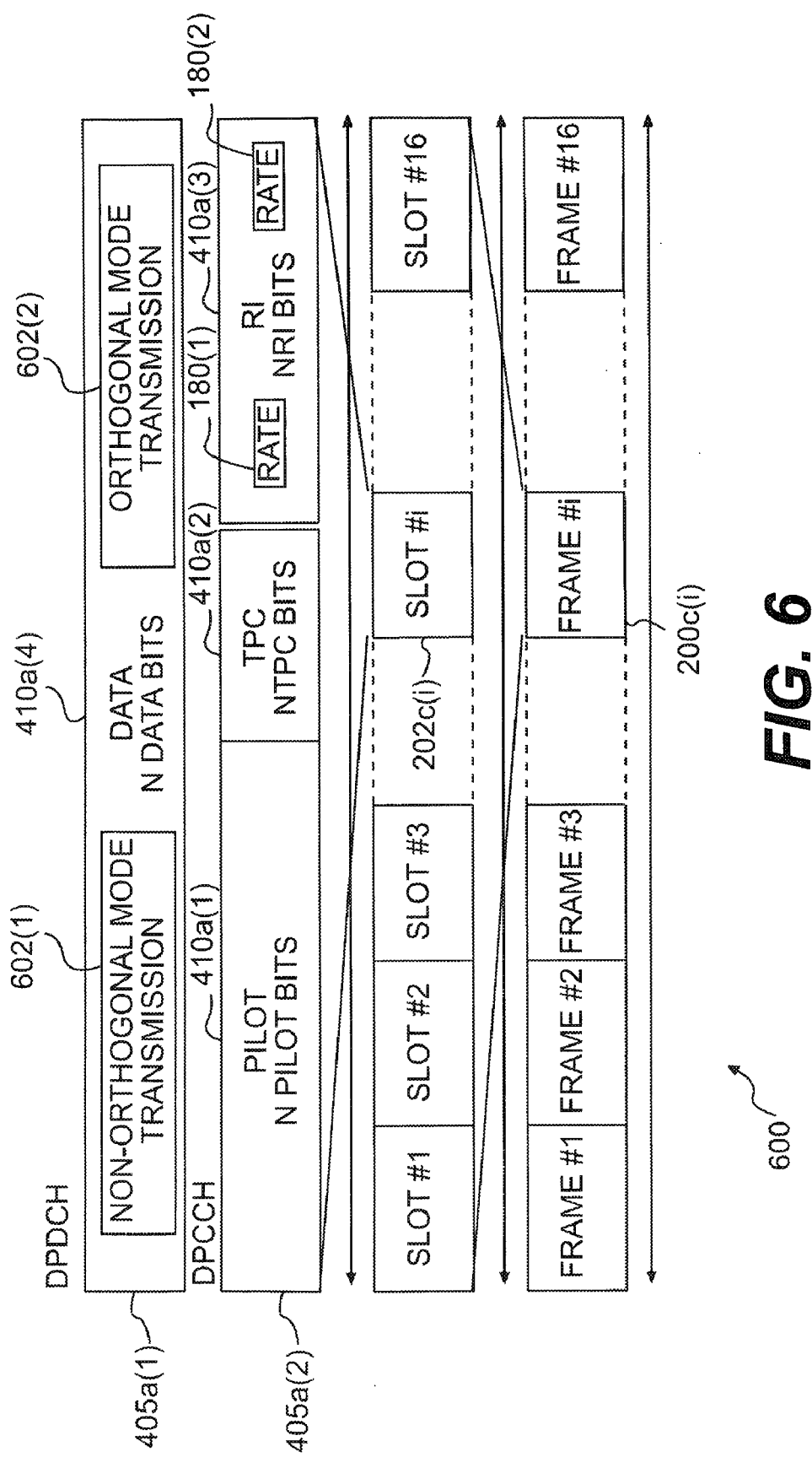
FIG. 6 illustrates a stylized representation of a frame format for scheduling transmissions in a first and a second transmission mode in a non-overlapping manner on the reverse link according to on illustrative embodiment of the present invention.

Referring to FIG. 6, a frame format 600 is illustrated to include a frame 200c(i) for enabling transmissions from the mobile stations 115(1-m) to the base station 110(1) on the reverse link 120 in orthogonal and/or non-orthogonal modes in a non-overlapping format. The frame 200c(i) may comprise a time slot 202c(i). The dedicated physical data channel (DPDCH) 405a(1) and the dedicated physical control channel (DPCCH) 405a(2) may be code-multiplexed and transmitted in parallel within each time slot, such as the time slot 202c(i).

According to one illustrative embodiment, the DPCCH 405a(2) may comprise pilot bits 410a(1), transmit power control bits, (TPC) 410a(2) and rate information bits (RI) 410a(3). The rate information bits 410a(3) may include the rate information 180(1) and 180(2), as shown in FIG. 1. The DPDCH 405a(1) may transmit the data bits 410a(4) over the reverse link 120. The DPDCH 405a(1) may comprise a non-orthogonal mode transmission 602(1) and an orthogonal transmission mode transmission 602(2) in a non-overlapping format. That is, a set of time slots may be allocated to the non-orthogonal mode transmission 602(1) and a second set of time slots may be allocated to the mode transmission 602(2).

In one embodiment, the cellular system 100 may wirelessly communicate mobile data at a speed and coverage desired by individual users or enterprises. According to one embodiment, the high-speed wireless data network may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS also referred as Wideband Code Division Multiple Access (WCDMA) includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g. a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of wireless communication, comprising:
partitioning at least one reverse link resource between orthogonal and non-orthogonal transmissions such that the reverse link resources allocated to the orthogonal and non-orthogonal transmissions are non-overlapping in at least one resource dimension;
scheduling the orthogonal transmissions using dedicated rate control;
scheduling the non-orthogonal transmissions using common rate control; and
wherein partitioning said at least one reverse link resource comprises allocating a first portion of the reverse link resource to at least one first mobile station for orthogonal reverse link transmission to a base station and allocating a second portion of the reverse link resource to at least one second mobile station for non-orthogonal reverse link transmissions to the base station.

2. The method of claim 1, wherein partitioning said at least one reverse link resource comprises allocating the first portion of the reverse link resource to a plurality of first mobile stations for transmission according to orthogonal frequency division multiplexing and allocating the second portion of the reverse link resource to a plurality of second mobile stations for transmission according to code division multiple access.

3. The method of claim 1, wherein allocating the first and second portions of the reverse link resource comprises transmitting first and second messages from the base station to said at least one first mobile station and said at least one second mobile station, respectively, indicating allocation of the first and second portions of the reverse link resource.

4. The method of claim 1, wherein partitioning said at least one reverse link resource comprises partitioning said at least one reverse link resource such that orthogonal and non-orthogonal transmission are non-overlapping in time.

5. The method of claim 1, wherein partitioning said at least one reverse link resource comprises partitioning said at least one reverse link resource such that orthogonal and non-orthogonal transmission are non-overlapping in frequency.

6. The method of claim 1, wherein partitioning said at least one reverse link resource comprises partitioning said at least one reverse link resource such that orthogonal and non-orthogonal transmission are non-overlapping in at least one spatial dimension.

7. The method of claim 1, wherein scheduling the orthogonal transmissions using dedicated rate control comprises transmitting separate rate commands to each mobile station so that each mobile station can determine a transmission rate independently based on the corresponding rate command.

8. The method of claim 1, wherein scheduling the non-orthogonal transmissions using common rate control comprises transmitting a common rate command to a plurality of mobile stations so that each of the plurality of mobile stations can determine a transmission rate based on the common rate command.

9. The method of claim 1, comprising receiving scheduled signals from the first and second mobile stations using the allocated first and second resources.

* * * * *